United States Patent
Takaishi

(10) Patent No.: US 7,460,330 B2
(45) Date of Patent: Dec. 2, 2008

(54) SETTLING JUDGMENT METHOD FOR POSITIONING CONTROL DEVICE AND POSITIONING CONTROL DEVICE

(75) Inventor: Kazuhiko Takaishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/598,998

(22) Filed: Nov. 14, 2006

(65) Prior Publication Data

US 2007/0230035 A1 Oct. 4, 2007

(30) Foreign Application Priority Data

Mar. 31, 2006 (JP) .............................. 2006-097182
Jun. 9, 2006 (JP) .............................. 2006-160640

(51) Int. Cl.
*G11B 5/596* (2006.01)
*G11B 19/02* (2006.01)

(52) U.S. Cl. .............. 360/78.04; 360/78.09; 360/77.02; 360/69

(58) Field of Classification Search ........................ None
See application file for complete search history.

(56) References Cited

U.S. PATENT DOCUMENTS

| 5,307,330 | A |   | 4/1994 | Okamura |           |
|-----------|---|---|--------|---------|-----------|
| 5,731,973 | A | * | 3/1998 | Takaishi et al. | ............... 700/56 |
| 5,859,742 | A | * | 1/1999 | Takaishi | .................. 360/78.01 |
| 5,914,830 | A |   | 6/1999 | Kadlec |           |
| 6,101,065 | A | * | 8/2000 | Alfred et al. | .............. 360/78.04 |
| 6,995,944 | B1| * | 2/2006 | Takaishi et al. | ........... 360/78.06 |
| 2005/0046984 | A1 |   | 3/2005 | Gupta |           |
| 2006/0007592 | A1 |   | 1/2006 | Takaishi |           |
| 2007/0230305 | A1 | * | 10/2007 | Takaishi | .................. 369/53.29 |
| 2008/0024907 | A1 | * | 1/2008 | Takaishi | .................. 360/78.09 |

FOREIGN PATENT DOCUMENTS

| EP | 0 744 754 | 5/1997 |
| EP | 1 276 100 | 1/2003 |
| JP | 4-298868 | 10/1992 |
| JP | 07-295650 | 11/1995 |
| JP | 8-106742 | 4/1996 |

* cited by examiner

*Primary Examiner*—K. Wong
(74) *Attorney, Agent, or Firm*—Greer, Burns & Crain, Ltd.

(57) ABSTRACT

In a settling judgment method for judging whether an object is settled in a target position, the settlement is judged accurately at high-speed. In a positioning device for controlling a position of an object using a position error between a target position and a current position, a plurality of judgment blocks, each of which has a different judgment slice value and continuous sample count, are created in a settling judgment block for judging whether the object is settled within the positioning accuracy range of the target position, the judgment value of the position error computed by the judgment formula is judged in each judgment block each having a different judgment slice value and continuous sample count respectively, and OR of the judgment results is output. According to the settling judgment formula, settling can be judged accurately at high-speed, and both improvement of positioning accuracy and high-speed judgment can be implemented.

18 Claims, 17 Drawing Sheets

Servo Mark
Gray Code
Index
PosA PosB PosC PosD

FIG. 13

| FREQUENCY F | MAXIMUM RATE Rate(Max) |
|---|---|
| $f_1$ | |
| $f_2$ | |
| ⋮ | |
| $f_n (=F_s/2)$ | |

| JUDGMENT FORMULA | NUMBER OF SAMPLES | SLICE (ABSOLUTE VALUE) |
|---|---|---|
| $y[n]$ | 3 | 0.075 |
| | 5 | 0.10 |
| $2 \cdot y[n] - y[n-1]$ | 3 | 0.15 |
| | 5 | 0.15 |

TOLERANCE TRACK WIDTH = ±0.15

| JUDGMENT FORMULA | NUMBER OF SAMPLES | W SLICE (TOLERANCE = ±0.15) | R SLICE (TOLERANCE = ±0.30) |
|---|---|---|---|
| $y[n]$ | 3 | 0.075 | 0.150 |
|  | 5 | 0.10 | 0.20 |
| $2 \cdot y[n] - y[n-1]$ | 3 | 0.15 | 0.30 |
|  | 5 | 0.15 | 0.30 |

SETTLING JUDGMENT METHOD FOR POSITIONING CONTROL DEVICE AND POSITIONING CONTROL DEVICE

CROSS-REFERENCE TO RELATED APPLICATIONS

This application is based upon and claims the benefit of priority from the prior Japanese Patent Application No. 2006-97182, filed on Mar. 31, 2006, and the prior Japanese Patent Application No. 2006-160640, filed on Jun. 9, 2006, the entire contents of which are incorporated herein by reference.

BACKGROUND OF THE INVENTION

1. Field of the Invention

The present invention relates to a settling judgment method and a positioning control device for judging whether a target is settled in or following to a target position in a positioning control device for moving an object to a target position by an actuator, and more particularly to a settling judgment method for a positioning control device and the positioning control device for decreasing the time required settling judgment and performing the settling judgment accurately.

2. Description of the Related Art

Positioning control devices for moving an object to a target position are widely used. High precision positioning is required for positioning control devices used for disk devices. Particularly to a magnetic disk device and optical disk device, accurate positioning of the head to the target track is extremely important to improve recording density. A method for judging whether positioning control to the target position is being performed accurately is settling judgment.

In the settling judgment of positioning control devices, positioning control parameter after movement or after position is shifted must satisfy predetermined positioning conditions during a predetermined time. In the case of a magnetic disk device, for example, settling judgment after seek control and settling judgment during follow up control are performed. In these settling judgments it is judged that settling has completed when the value of the judgment formula based on the position error continuously satisfies being in a predetermined slice range, and the continuing count is more than a predetermined count (sample count).

As a method for this settling judgment, a method for estimating the position of the next sample (Japanese Patent Application Laid-Open No. H08-106742) and a method for applying an estimated position using an observer (Japanese Patent Application Laid-Open No. H04-298868) have been proposed.

SUMMARY OF THE INVENTION

In these prior arts, the conditions of settling judgment, particularly the slice and number of samples, are fixed. For example, it is regarded as preferable to set the slice high and the number of samples also high to perform settling judgment accurately.

In disk devices, for example, the width of the data track is determined and the data tracks are placed adjacent to each other in the radius direction of a disk. Therefore if a head moves to an adjacent track after the settling judgment at seeking or follow up, the data may be unintentionally erased. Or a part of the data may be erased and the S/N of the recorded data may deteriorate.

Also in recovering control at seek control or follow up control of the disk device, the settling judgment time should be shorter to improve the response performance. But if the settling judgment time is too short, the residual vibration after seeking may be missed, then positioning accuracy, after settling is completed, becomes poor.

As larger capacities and higher speeds are demanded for disk devices, the settling judgment conditions are becoming critical for the safety of data and higher speeds, but the implementation of both accuracy and high-speed is difficult with the prior art.

With the foregoing in view, it is an object of the present invention to provide a settling judgment method for a positioning control device, and positioning control device, for judging settling accurately at high-speed.

It is another object of the present invention to provide a settling judgment method for a positioning control device, and the positioning control device for setting a plurality of slice values and sample counts according to a settling judgment formula and judging settling accurately at high-speed according to the settling judgment formula.

It is still another object of the present invention to provide a settling judgment method for a positioning control device and the positioning control device for improving the response performance of moving time and also improving positioning accuracy.

To achieve these objects, the settling judgment method of the present invention is a settling judgment method for judging settling of a positioning control device, which controls a position of an object according to a positioning error between a target position and a current position, to a target position, having: a step of computing a judgment value of the position error for each sample by a predetermined judgment formula; a first step of, by using a first judgment sample count and a first judgment slice value, judging whether a sample of which judgment value is less than the first judgment slice value continues for the first judgment sample count; a second step of, by using a second judgment sample count which is different from the first judgment sample count and a second judgment slice value which is different from the first judgment slice value, judging whether a sample of which judgment value is less than the second judgment slice value continues for the second judgment sample count; and a step of outputting OR of the judgment results of the first judgment step and the second judgment step as the settling judgment result.

The positioning control device of the present invention has a positioning control block which controls a position of an object according to a position error between a target position and a current position, and a settling judgment block which computes a judgment value of the position error for each sample by a predetermined judgment formula, by using a first judgment sample count and a first judgment slice value, judges whether a sample of which judgment value is less than the first judgment slice value continues for the first judgment sample count, by using a second judgment sample count, which is different from the first judgment sample count and a second judgment slice value which is different from the first judgment slice value, judges whether a sample of which judgment value is less than the second slice value continues for the second judgment sample count, and outputs OR of both the judgment results as the settling judgment result.

In the present invention, it is preferable that the first step further has a step of using the first sample count which is relatively little and the first slice value which is relatively little, and the second step further has a step of using the second sample count which is relatively large and the second slice value which is relatively large.

Also it is preferable that the present invention further has a step of computing a judgment value of the position error for each sample using another predetermined judgment formula, a third step of, by using a third judgment sample count and a third judgment slice value, judging whether a sample of which judgment value is less than the third slice value continues for the third judgment sample count, and a step of outputting AND of the above mentioned OR and the judgment result of the third step as the settling judgment result.

Also in the present invention, it is preferable that the third step further has a fourth step of judging whether a sample of which judgment value is less then the fourth slice value continues for the fourth judgment sample count, a fifth step of, by using a fifth judgment sample count which is different from the fourth judgment sample count and a fifth judgment slice value which is different from the fourth judgment slice value, judging whether a sample of which judgment value is less than the fifth slice value continues for the fifth judgment sample count, and a step of outputting OR of the judgment results of the fourth judgment step and the fifth judgment step as the above mentioned judgment result.

Also in the present invention, it is preferable that the first step and the second step further have a step of using a slice value and a judgment sample count, which are set such that a maximum value of a ratio of the maximum amplitude value determined for each frequency of periodic disturbance from the maximum amplitude value of the judgment value when the periodic disturbance is applied, is confined within a predetermined positioning accuracy.

Also in the present invention, it is preferable that the first step and the second step further have a step of using a slice value and a judgment sample count which are set such that a maximum value of a ratio of the maximum amplitude value determined for each of periodic disturbance from the maximum amplitude value of the judgment value when a sine wave is applied as the periodic disturbance, is confined within a predetermined positioning accuracy.

Also in the present invention, it is preferable that the output step further has a step of outputting a judgment result on whether the position of the head is settled in a target position of the disk.

Also in the present invention, it is preferable that the positioning control block positions a head as the object to a target position of the disk.

Also in the present invention, it is preferable that the settling judgment block judges whether the head is settled within the position accuracy range of the target position.

Also in the present invention, it is preferable that the settling judgment block judges that the judgment value is less than a write slice value which is set such that a maximum value of a ratio of the maximum amplitude value determined for each frequency of periodic disturbance from the maximum amplitude value of the judgment value when the periodic disturbance is applied, is confined within a predetermined write positioning accuracy of the head, or less than a read slice value which is set such that the above maximum value is confined within a predetermined read positioning accuracy of the head.

Also in the present invention, it is preferable that the settling judgment block selects the write slice value or read slice value depending on whether operation is the read operation or write operation of the disk by the head.

Also in the present invention, it is preferable that the settling block judges whether the head is settled at the target position during seek control of the head.

Also in the present invention, it is preferable that the settling judgment block judges whether the head is following up to the target position.

In the present invention, a plurality of judgment slice values and continuous sample counts are set for judging settling, and settling is judged using the judgment values of different judgment slice values and continuous sample counts, so settling can be judged accurately at high-speed according to the settling judgment formula, and both improvement of positioning accuracy and high-speed judgment can be implemented.

BRIEF DESCRIPTION OF THE DRAWINGS

FIG. 13 is a table of the maximum value ratio for each frequency in FIG. 10 to FIG. 12;

DESCRIPTION OF THE PREFERRED EMBODIMENTS

Embodiments of the present invention will now be described in the sequence of configuration of positioning control device, settling judgment mechanism, setting settling judgment conditions, other positioning control devices and other embodiments, but the present invention is not limited to these embodiments.

(Configuration of Positioning Control Device)

Figure 1:
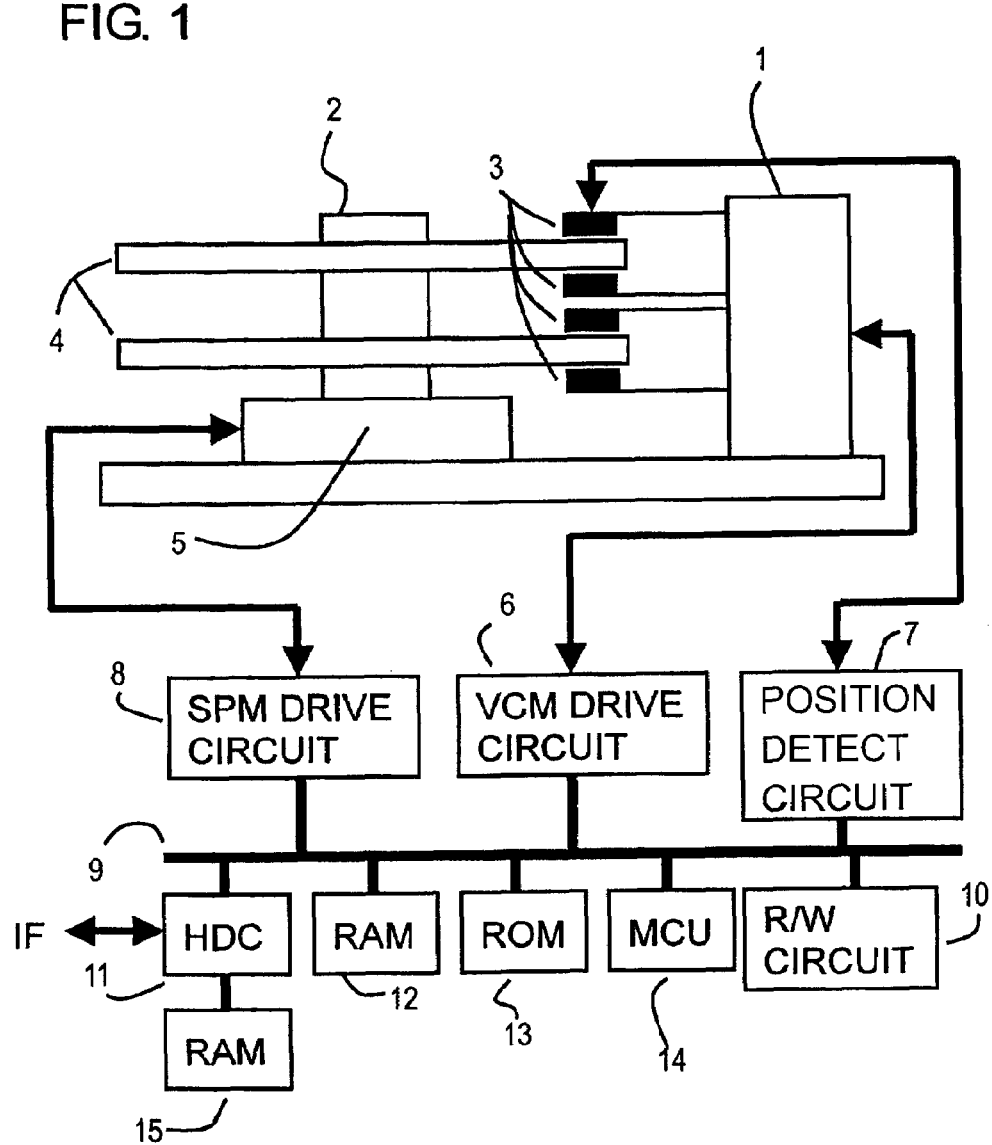
FIG. 1 is a block diagram depicting the positioning control device according to an embodiment of the present invention.
Figure 2:
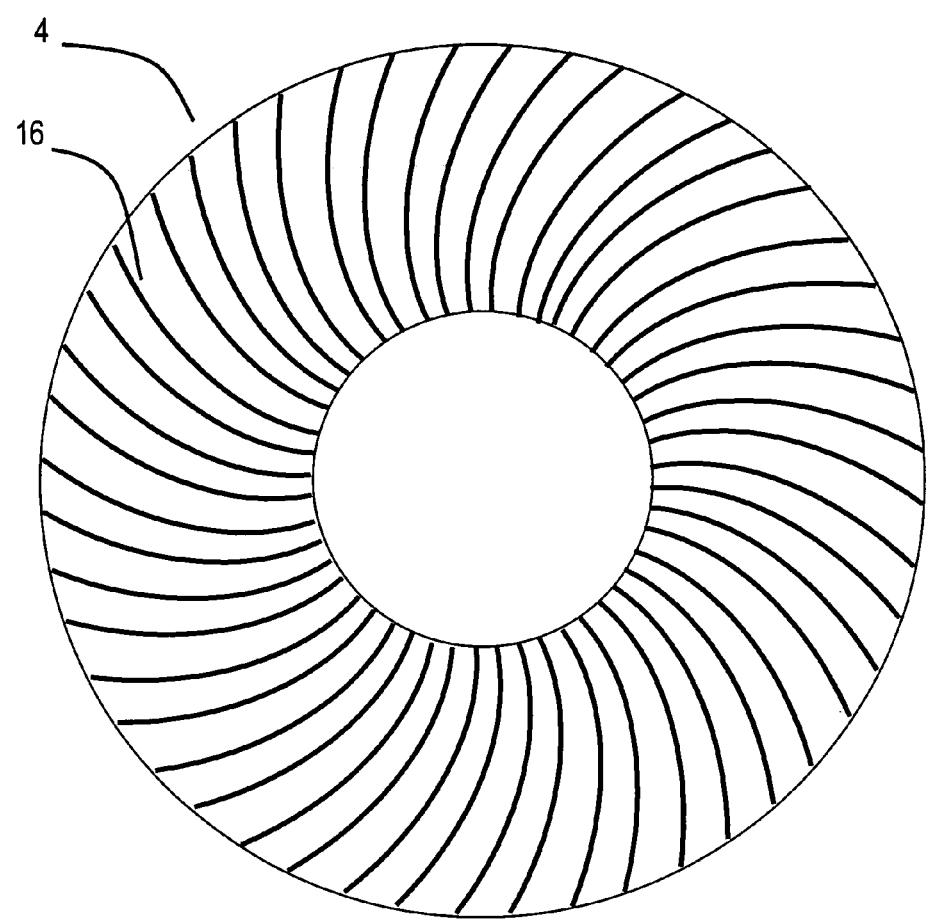
FIG. 2 is a diagram depicting the configuration of the magnetic recording medium in FIG. 1.
Figure 3:
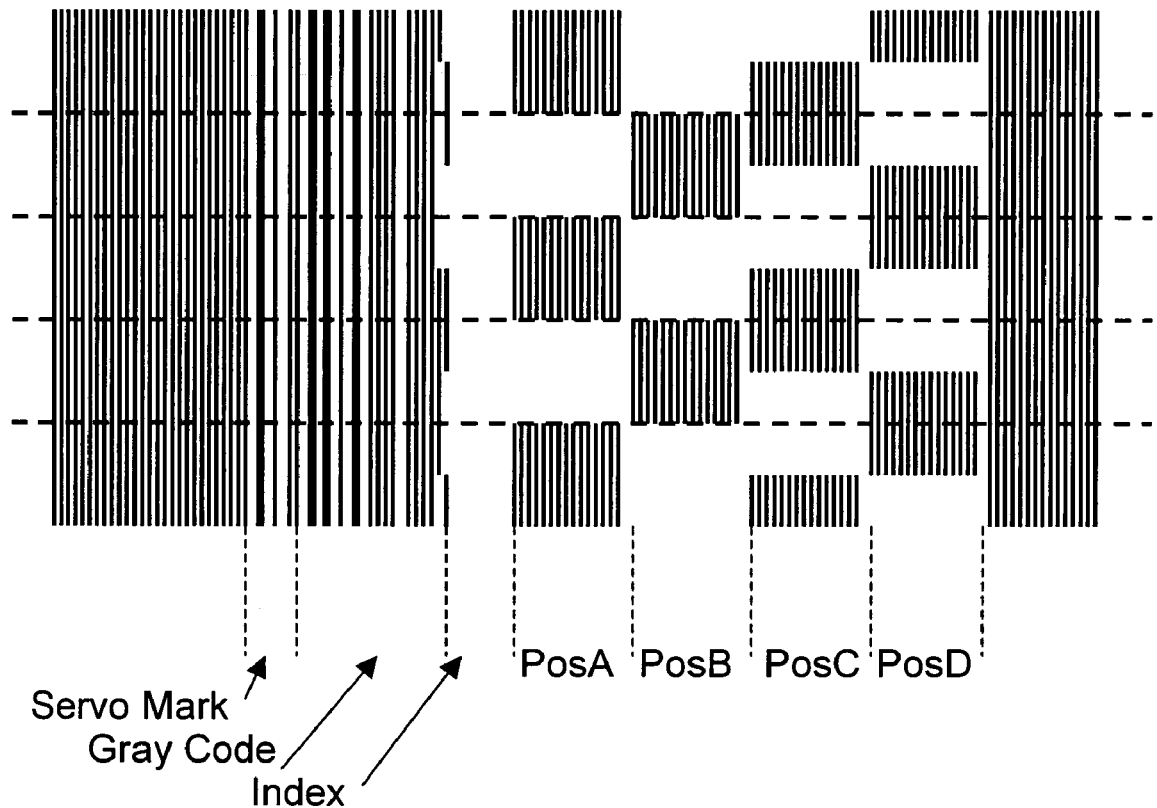
FIG. 3 is a diagram depicting the servo area in FIG. 2.
Figure 4:
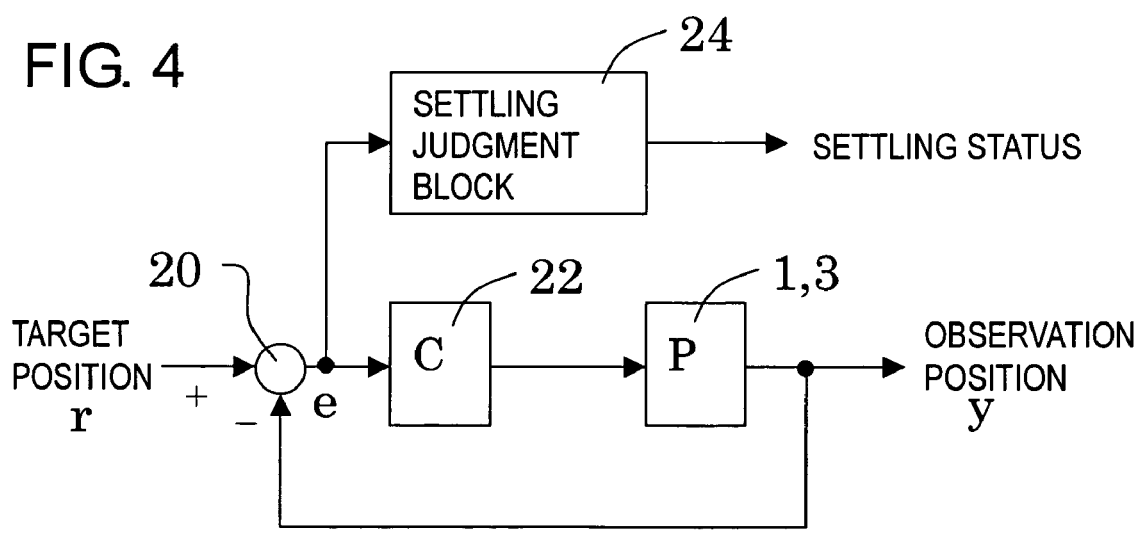
FIG. 4 is a block diagram depicting the positioning control system in FIG. 1.
Figure 5:
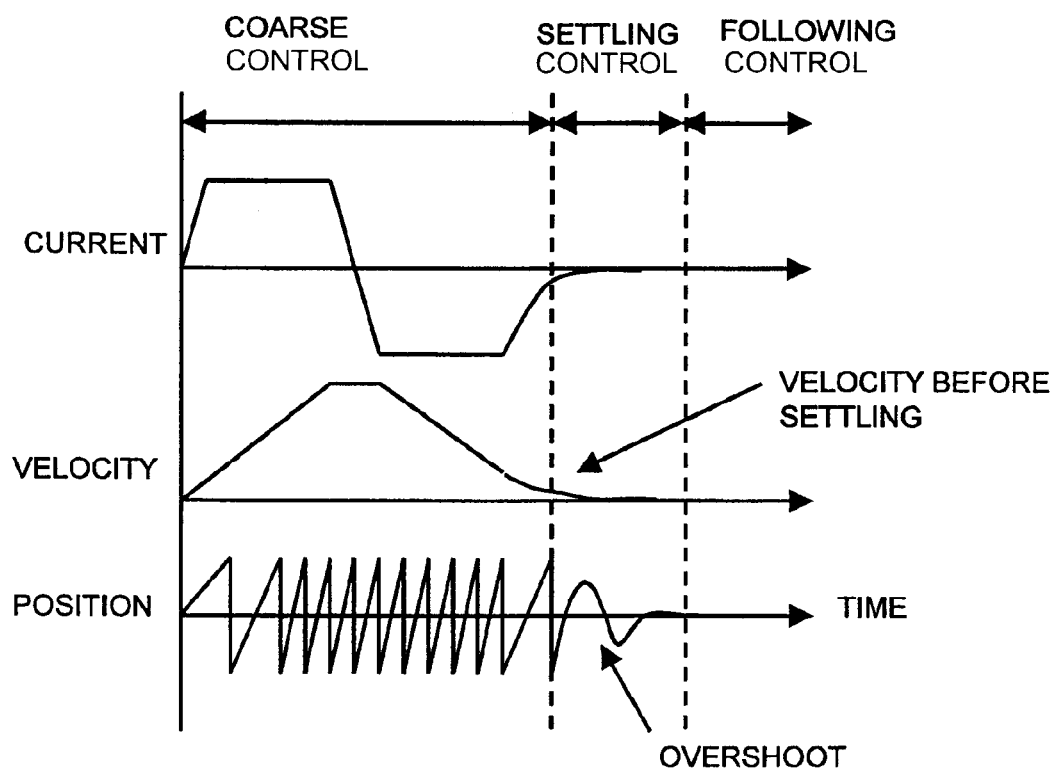
FIG. 5 is a diagram depicting the transition of the head moving control in FIG. 1 and FIG. 4.

FIG. 1 is a block diagram depicting the positioning control device according to an embodiment of the present invention, FIG. 2 is a diagram depicting the arrangement of position signals and tracks of the magnetic disk in FIG. 1, FIG. 3 is a diagram depicting the position signals of the magnetic disk in FIG. 1 and FIG. 2, FIG. 4 is a block diagram depicting the head position control system in FIG. 1, and FIG. 5 is a diagram depicting the head position control in FIG. 1 to FIG. 4.

FIG. 1 shows a magnetic disk device, which is a type of disk device, as an example of the positioning control device. As FIG. 1 shows, a magnetic disk 4, which is a magnetic storage medium, is installed at a rotation axis 2 of a spindle motor 5. The spindle motor 5 rotates the magnetic disk 4. An actuator (VCM) 1 has a magnetic head 3 at the tip, and moves the magnetic head 3 in the radius direction of the magnetic disk 4 by rotating.

The actuator 1 is comprised of a voice coil motor (VCM) which rotates with the rotation axis as the center. In FIG. 1, two magnetic disks 4 are mounted on the magnetic disk device, and four magnetic heads 3 are simultaneously driven by the same actuator 1. The same configuration can be used even if there is one magnetic disk 4, and there are two magnetic heads.

The magnetic head 3 is a separate type head comprised of a read element and write element. The magnetic head 3 is comprised of a read element, including a magneto-resistance (MR) element, stacked on the slider, and a write element, including the write coil, stacked thereon.

A position detection circuit 7 coverts the position signals (analog signals) read by the magnetic head 3 into digital signals. A read/write (R/W) circuit 10 controls reading and writing of the magnetic head 3. A spindle motor (SPM) drive circuit 8 drives the spindle motor 5. A voice coil motor (VCM) drive circuit 6 supplies the drive circuit to the voice coil motor (VCM) 1 and drives the VCM 1.

A microcontroller (MCU) 14 detects (demodulates) the current position using the digital position signals from the position detection circuit 7, and computes the VCM drive instruction value according to the error between the detected current position and the target position. In other words, the microcontroller 14 performs position demodulation and servo control (position control). A read only memory (ROM) 13 stores the control programs of the MCU 14. A random access memory (RAM) 12 stores data for processing of the MCU 14.

A hard disk controller (HDC) 11 judges a position in one track based on the sector number of the servo signal, and records/reproduces the data. A random access memory (RAM) for a buffer 15 temporarily stores the read data and write data. The HDC 11 communicates with the host via an interface IF, such as USB, ATA and SCSI. A bus 9 connects these composing elements.

As FIG. 2 shows, the magnetic disk 4 has servo areas 16 where servo information which are arranged in the sector of each track, are recorded in the circumference direction from the outer circumference to the inner circumference. The solid lines in FIG. 2 show the positions where the servo information 16 is recorded.

As FIG. 3 shows, the servo information 16 is position signals (servo information) recorded by magnetic recording or by mechanical patterns such as pits. A position signal comprises a servo mark ServoMark, track number GrayCode, index Index and offset information (servo burst) PosA, PosB, PosC and PosD. The dotted line in FIG. 3 shows the track center of the servo.

The position signals in FIG. 3 are read by the read element of the head 3, and the position of the magnetic head in the radius direction is detected using the track number GrayCode and the offset information PosA, PosB, PosC and PosD. Also based on the index signal Index, the position of the magnetic head in the circumference direction is acquired.

For example, the sector number when the index signal is detected is set to No. 0, is counted up each time a servo signal is detected, and the sector number of each sector of the track is acquired. The sector number of the servo signal becomes a reference when the data is recorded and reproduced. There is one index signal in a track. A sector number may be set instead of the index signal.

FIG. 4 is a block diagram depicting the computation of the servo control system executed by the MCU 14. As FIG. 4 shows, the servo control system computes the position error 'e' between the target position 'r' and the current position 'y' by the computing block 20, and the control amount Un is computed and VCMs 1 and 3, which are the plants 22, are driven by the control block (Cn) 21. For the position of the plant, the servo signal from the magnetic head 3 is demodulated, and the current position 'y' is computed, which is fed back to the computing block 20.

The settling judgment block 24 judges settling from the position error 'e' by using the settling judgment formula and settling judgment conditions (slice value and sample count). For the settling judgment formula, e (=Y[n]) itself is used, or (2·Y[n]−Y[n−1]) is used, or both of these are used.

FIG. 5 shows an example of the seek control of the actuator executed by the MCU 14 in FIG. 1 and FIG. 4. The MCU 14 confirms the position of the actuator through the position detection circuit 7 in FIG. 1, performs servo computation, and supplies appropriate current to the VCM 1. FIG. 5 shows the transition of the control from the start of seeking when the head 3 is moved from a certain track position to the target track position, current of the actuator 1, velocity of the actuator (head), and position of the actuator (head).

In other words, in seek control, the head is moved to the target position through the transition from coarse control, settling control and following control (follow up control). The coarse control is basically a velocity control, and the settling control and following control are basically position controls for both of which the current position of the head 3 must be detected. In the settling control, settling is judged, and read or write is enabled. In following control, if off track is generated, settling is judged when recovery control to the track center is performed.

To confirm the position like this, the servo signals are recorded on the magnetic disk in advance, as mentioned in FIG. 2 and FIG. 3. In other words, as FIG. 3 shows, servo marks which indicate the start positions of the servo signal, gray code which indicates the track number, index signals, and signals PosA-PosD which indicate the offset are recorded in advance. These signals are read by the magnetic head 3, and these servo signals are converted into digital values by the position detection circuit 7.

(Settling Judgment Mechanism)

Figure 6:
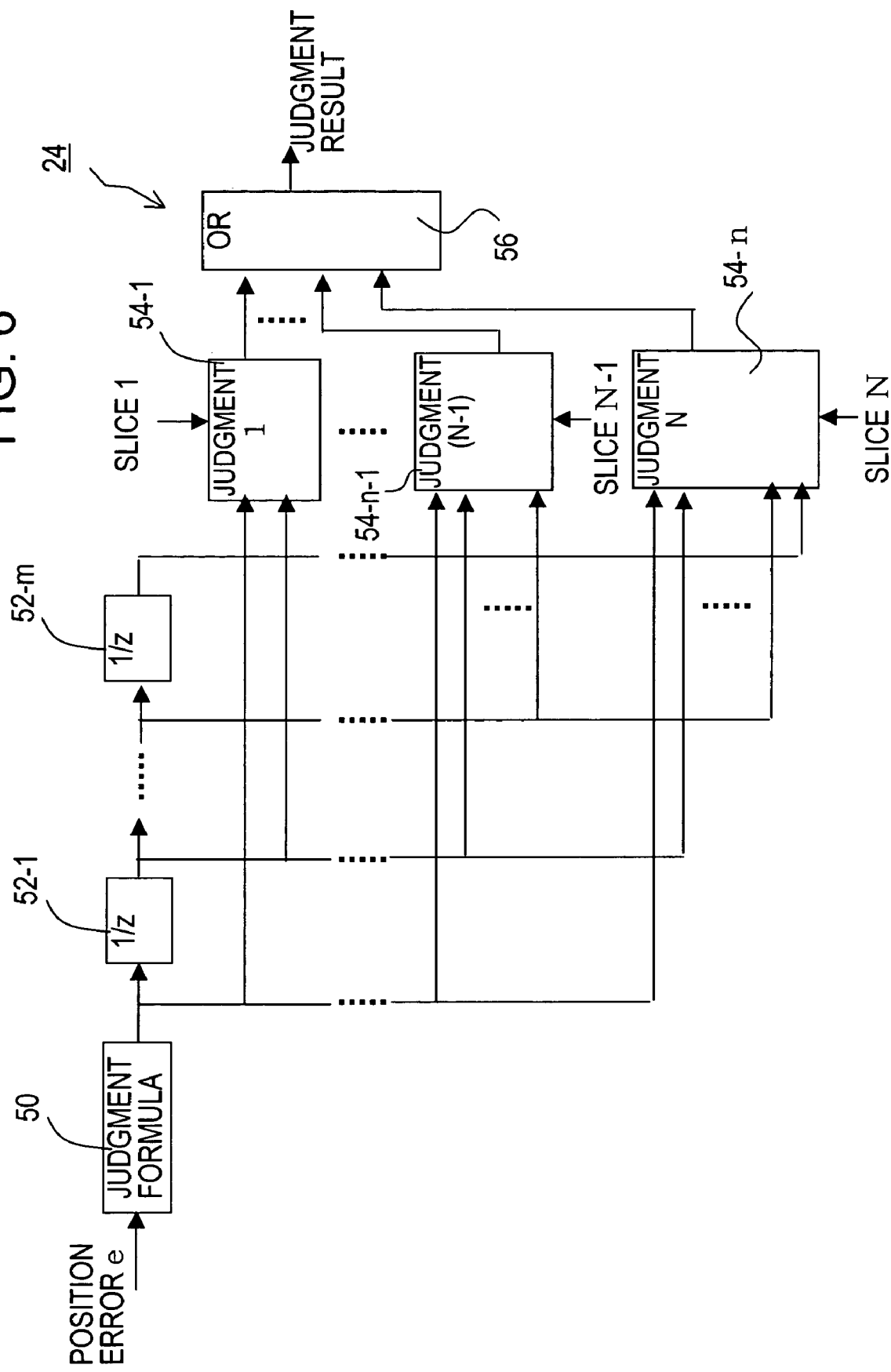
FIG. 6 is a block diagram depicting the settling judgment section in FIG. 4.
Figure 7:
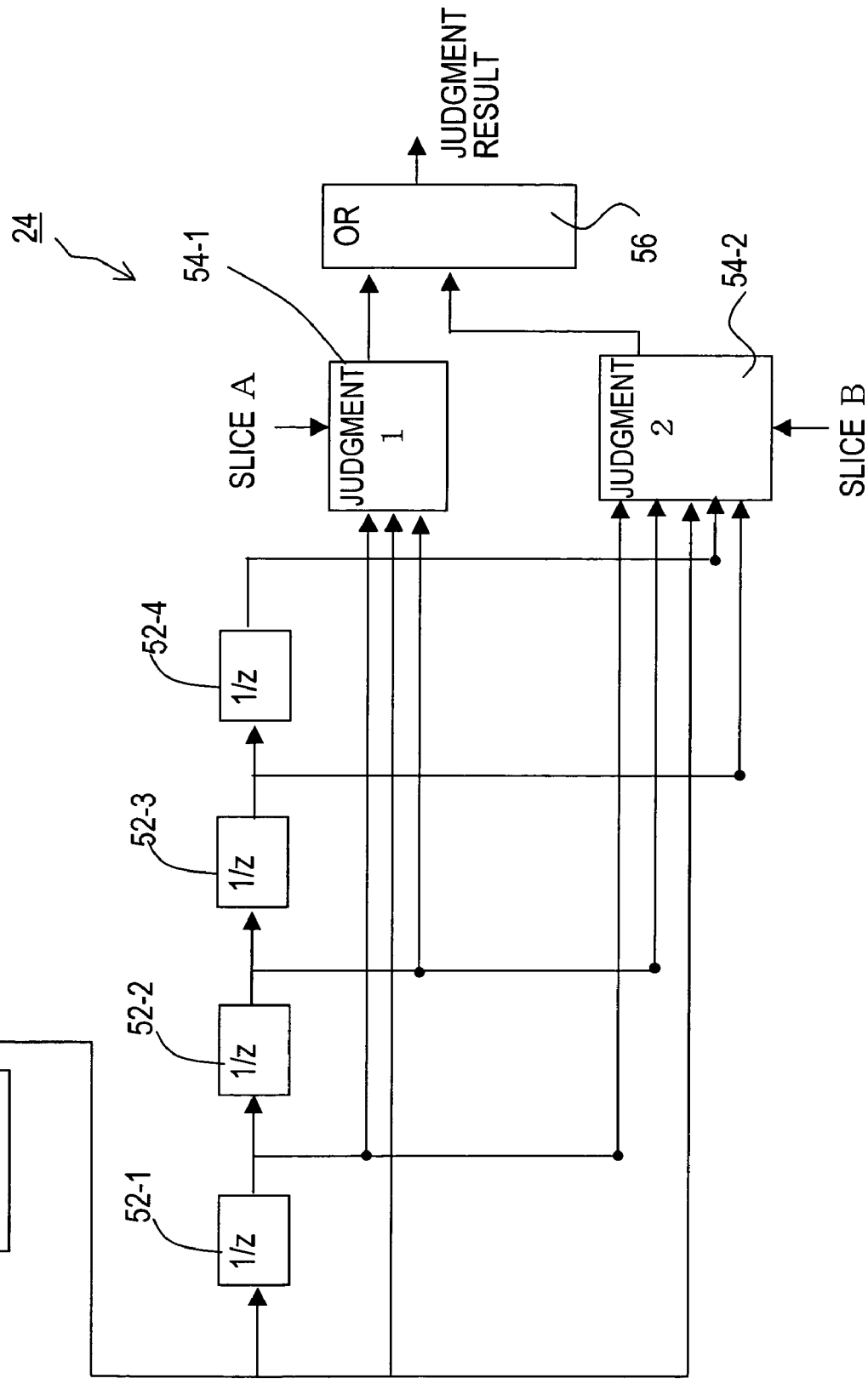
FIG. 7 is a block diagram depicting the settling judgment section of the first embodiment based on the configuration in FIG. 6.
Figure 8:
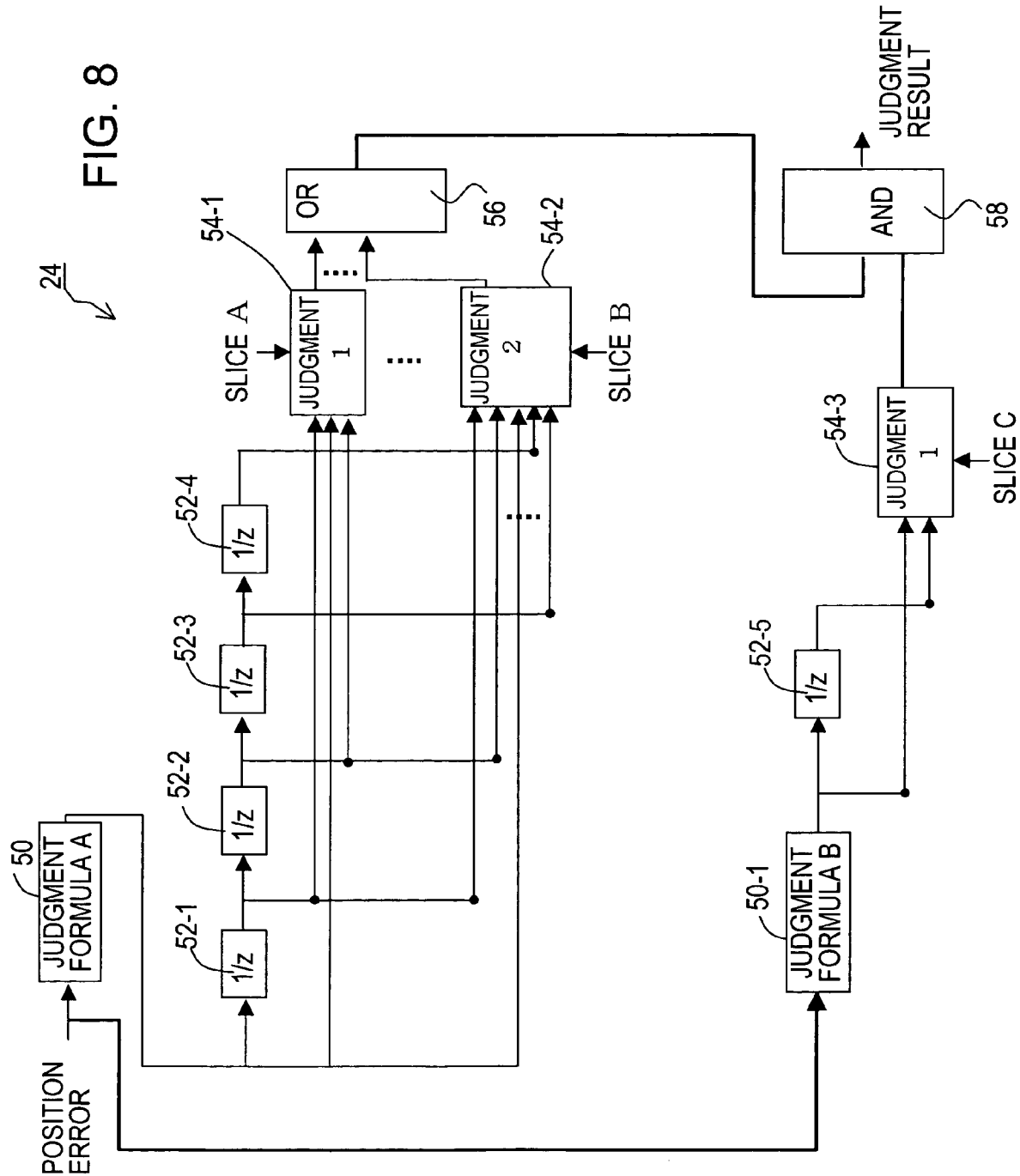
FIG. 8 is a block diagram depicting the settling judgment section of the second embodiment based on the configuration in FIG. 6.
Figure 9:
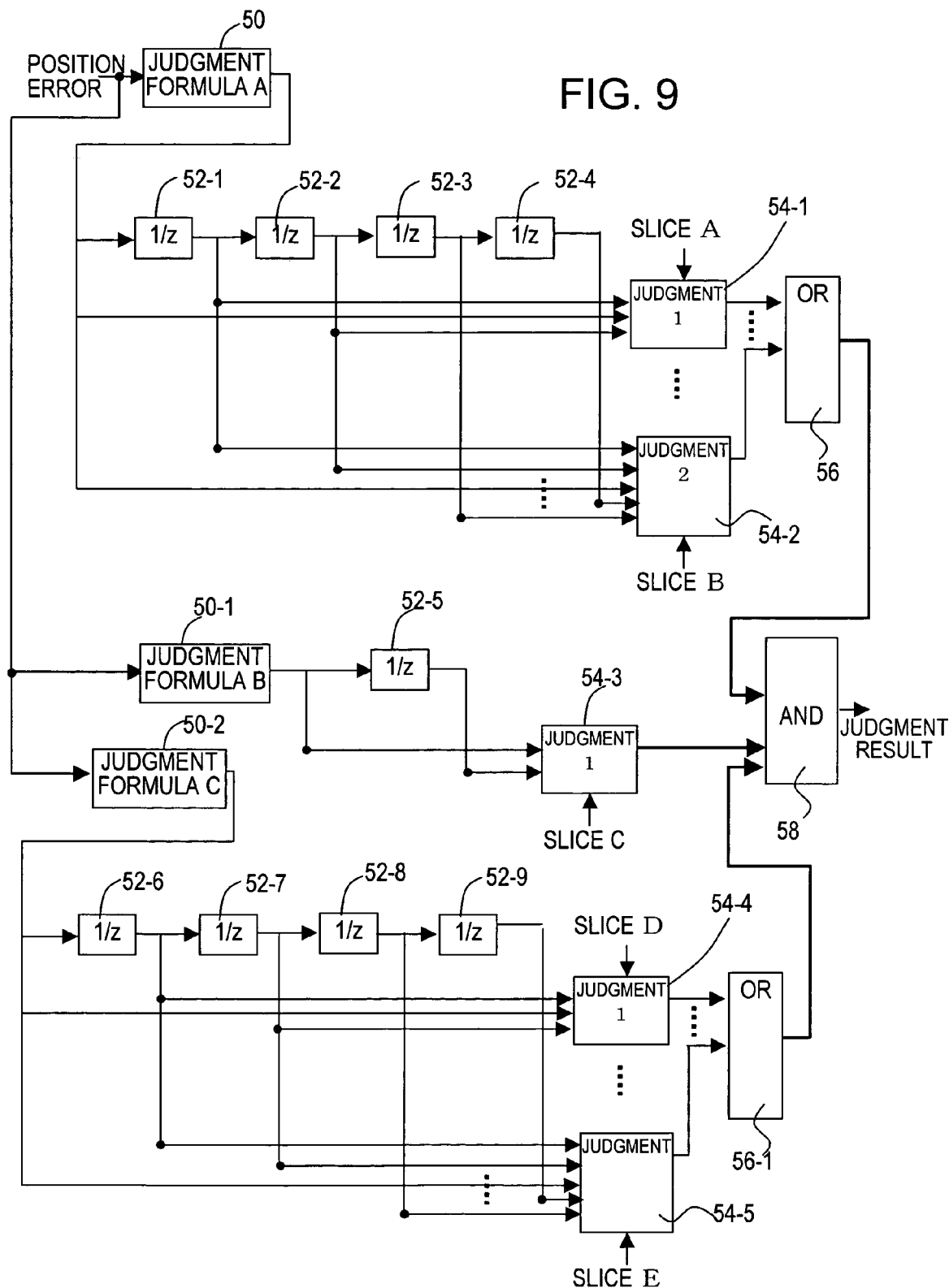
FIG. 9 is a block diagram depicting the settling judgment section of the third embodiment based on the configuration in FIG. 6.

FIG. 6 is a functional block diagram depicting the settling judgment mechanism according to an embodiment of the present invention, FIG. 7 is a functional block diagram depicting the settling judgment mechanism of the first embodiment using the configuration in FIG. 6. FIG. 8 is a functional block diagram depicting the settling judgment mechanism of the second embodiment using the configuration in FIG. 6, and FIG. 9 is a functional block diagram depicting the settling judgment mechanism of the third embodiment using the configuration in FIG. 6.

As FIG. 6 shows, the position error 'e' is input to the judgment formula block 50, and the judgment value is computed in the judgment formula block 50 according to a pre-determined settling judgment formula (e.g. $y[n]=e$). The judgment value is sequentially delayed by the delay blocks 52-1, ... 52-$m$. n number of settling judgment blocks 54-1, 54-2, ..., 54-$n$ are provided.

Each settling judgment block 54-1, 54-2, ..., 54-$n$ has a different settling judgment sample count and slice value respectively. For example, the first settling judgment block 54-1 judges whether the inputs of two samples of judgment value $y[n]$ and judgment value $y[n-1]$ are less than the first slice value, and judges as settled if inputs of both of these samples are less than the first slice value. In the same way, the Nth settling judgment block 54-$n$ judges whether the inputs of n samples of judgment value $y[n]$, judgment value $y[n-1]$, ..., judgment value $y[1]$ are less than the Nth slice value, and judges as settled if inputs of all the samples are less than the Nth slice value.

The OR circuit 56 determines the OR of the settling judgment results of each settling judgment block 54-1, 54-2, ..., 54-$n$, and outputs the settling judgment result. Therefore this slice value is set to be smaller as the sample count is lower, and to be larger as the sample count is larger. By this, the settling judgment result can be acquired from the judgment value with the lowest sample count, and also settling judgment is accurate since the slice value is changed depending on each settling judgment block.

FIG. 7 is a block diagram depicting the settling judgment of the first embodiment using the configuration in FIG. 6, where two settling judgment blocks 54-1 and 54-2, of which judgment sample count is 3 samples and 5 samples, are provided for one judgment formula, and slice values of the blocks 54-1 and 54-2 are set for a different slice A and slice B respectively.

In FIG. 7, composing elements the same as those in FIG. 6 are denoted with the same symbols. For example, the judgment formula is ($y[n]=e$) and the slice value A is smaller than the slice value B. Also as described in FIG. 19 and later, an appropriate slice value can be selected. Therefore an accurate judgment result can be acquired at smallest sample count from the judgment value.

FIG. 8 is a block diagram depicting the settling judgment of the second embodiment using the configuration in FIG. 6, wherein settling is judged using AND of the plurality of (two in this case) judgment formulas. Just like FIG. 7, in this example, two settling judgment blocks 54-1 and 54-2, of which judgment sample count is 3 samples and 5 samples respectively, are provided for one judgment formula A, and slice values of the blocks 54-1 and 54-2 are set in different slice A and slice B respectively, and one settling judgment block 54-3 of which judgment sample count is 2 samples is provided for another judgment formula B.

In FIG. 8, composing elements the same as those in FIG. 6 and FIG. 7 are denoted with the same symbols. For example, the judgment formula A is ($y[n]=e$), and the slice value A is smaller than the slice value B. Also as described in FIG. 19 and later, an appropriate slice value can be selected. The judgment formula B is ($2*y[n]-y[n-1]$), and the settling judgment block 54-3 outputs the settling result when the judgment value of which the judgment sample count is 2 samples is less than the slice value C.

AND of the OR result (output of the OR block 56) of the judgment results of the two settling judgment blocks 54-1 and 54-2 and the judgment result of the settling judgment block 54-3 is determined in the AND circuit 58, and the settling judgment result is output. By using a plurality of judgment formulas like this as well, accurate judgment result can be acquired at a smallest sample count from to the judgment value.

FIG. 9 is a block diagram depicting the settling judgment of the third embodiment using the configuration in FIG. 6, wherein settling is judged using AND of a plurality of (three in this case) judgment formulas. In FIG. 9, composing elements the same as those in FIG. 6 to FIG. 8 are denoted with the same symbols.

Just like FIG. 7 and FIG. 8, in this example, two settling judgment blocks 54-1 and 54-2, of which judgment sample count is 3 samples and 5 samples respectively, are provided for the first judgment formula A, and slice values of the blocks 54-1 and 54-2 are set to different slice values, that is slice A and slice B respectively, one settling judgment block 54-3 of which judgment sample count is 2 samples is provided for the second judgment formula B, and two settling judgment blocks 54-4 and 54-5 of which judgment sample count is 3 samples and 5 samples respectively are provided for the third judgment formula C, and slice values of the blocks 54-4 and 54-5 are set to different slice values, that is slice D and slice E respectively.

In FIG. 9, the judgment formula A of the first judgment formula block 50 is ($y[n]=e$), for example, and the slice value A is smaller than the slice value B. Also as described in FIG. 19 and later, an appropriate slice value can be selected. The judgment formula B of the second judgment formula block 50-1 is ($2*y[n]-y[n-1]$), and the settling judgment block 54-3 outputs the settling result when the judgment value of which the judgment sample count is 2 samples is less than the slice value C.

The judgment formula C of the third judgment formula block 50-2 is mentioned later ($y[n]+y[n-1]+y[n-2]$), for example, and the slice value D is smaller than slice value E.

AND of the OR result (output of OR block 56) of the judgment results of the two settling judgment blocks 54-1 and 54-2, the judgment result of the settling judgment block 54-3, and OR result (output of OR block 56-1) of the judgment results of the two settling judgment block 54-4 and 54-5, is determined in the AND circuit 58, and the settling judgment result is output. By using a plurality of judgment formulas like this as well, an accurate judgment result can be acquired at a smallest sample count from the judgment value.

(Setting Settling Judgment Conditions)

Figure 10:
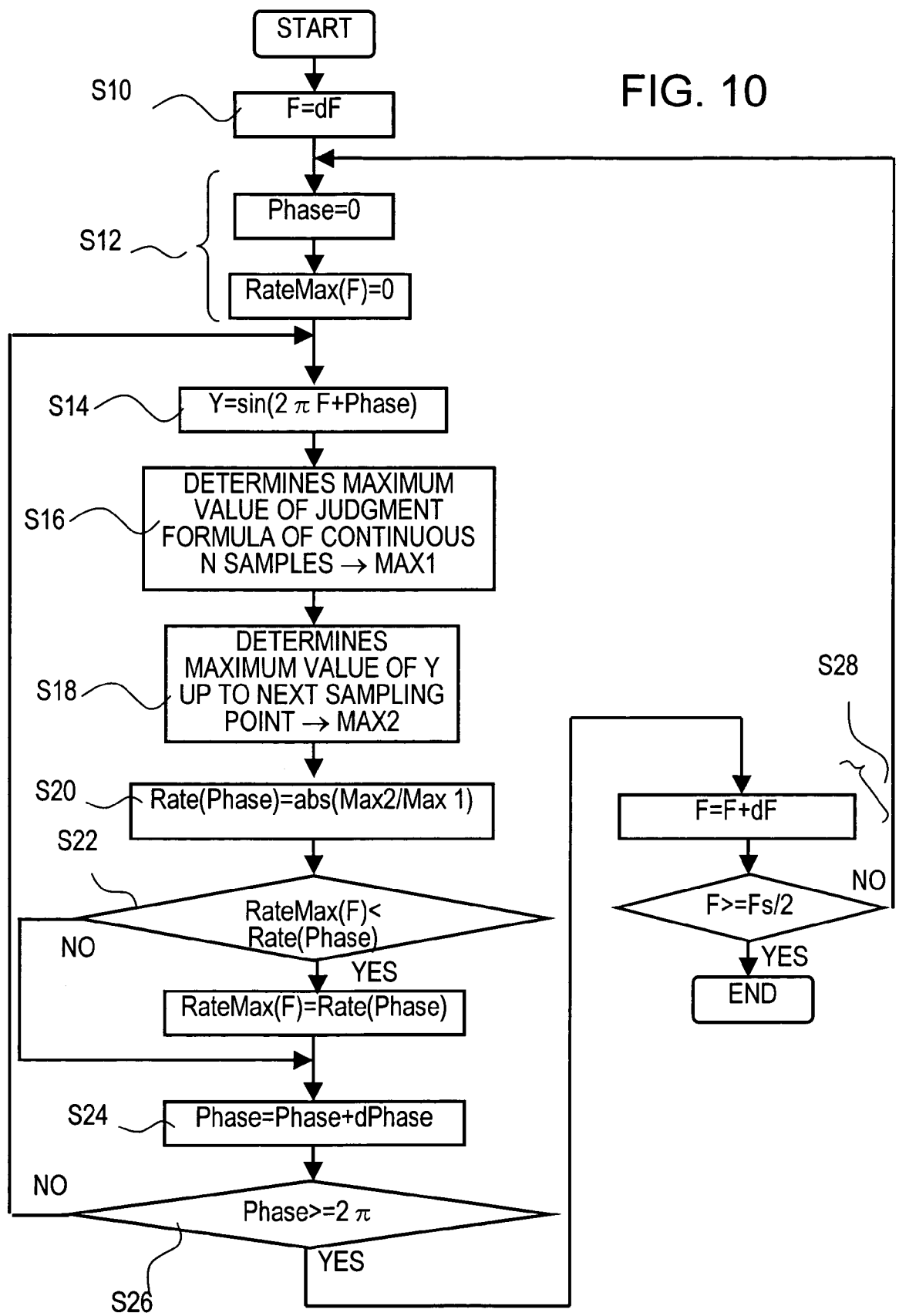
FIG. 10 is a flow chart depicting the maximum value ratio computing processing for each frequency of the settling judgment according to an embodiment of the present invention.
Figure 11:
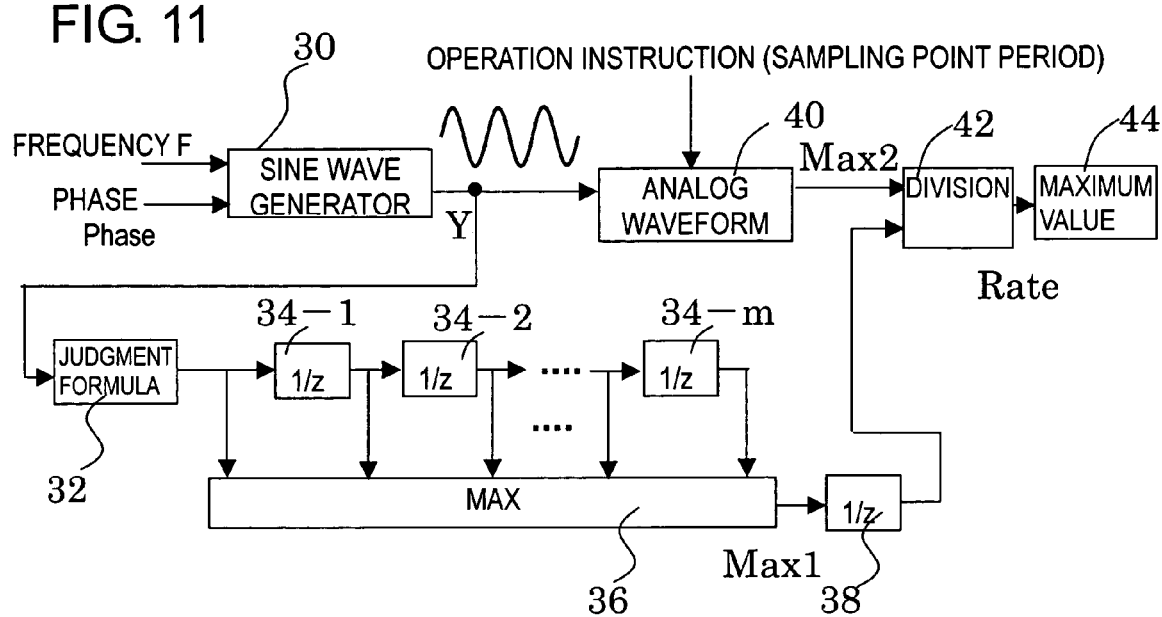
FIG. 11 is a block diagram depicting the maximum value ratio computing processing for each frequency in FIG. 10.
Figure 12:
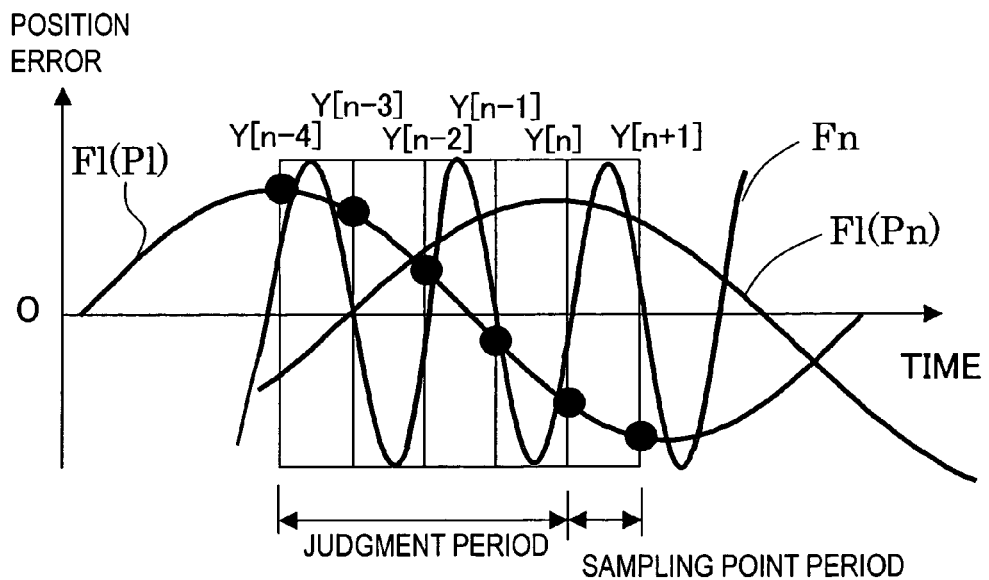
FIG. 12 is a diagram depicting the maximum value ratio computing processing for each frequency in FIG. 10 and FIG. 11.
Figure 16:
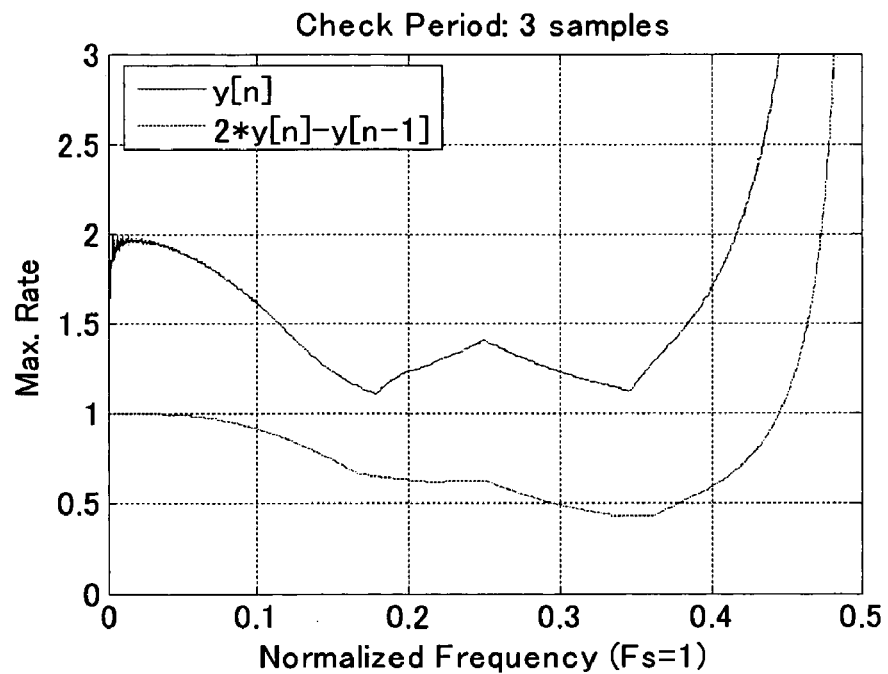
FIG. 16 is a relational diagram of the frequency vs. maximum value ratio including the maximum value in the sample period in FIG. 14.
Figure 17:
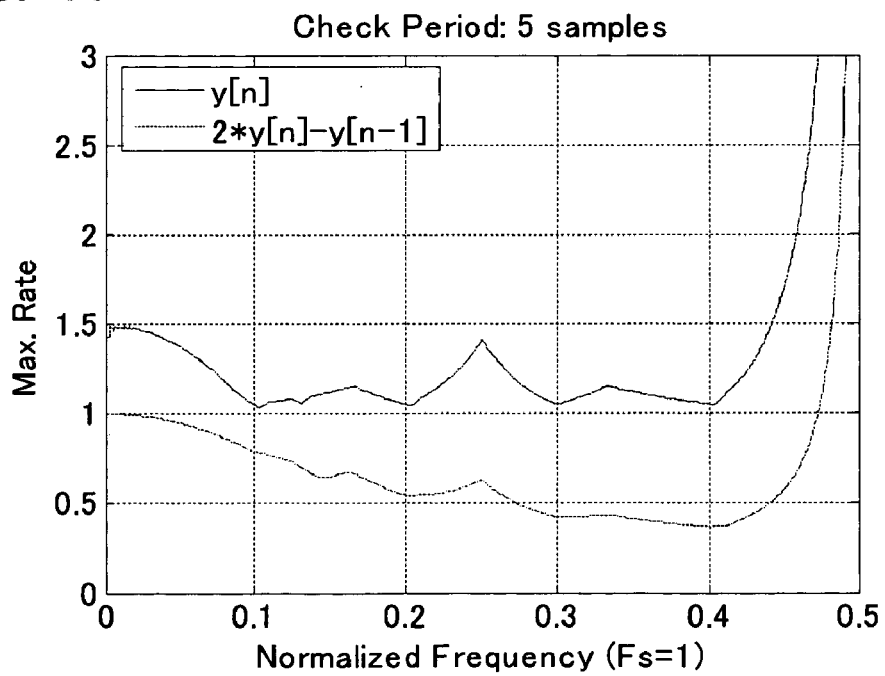
FIG. 17 is a relational diagram of the frequency vs. maximum value ratio including the maximum value in the sample period in FIG. 15.
Figures 18, 19:
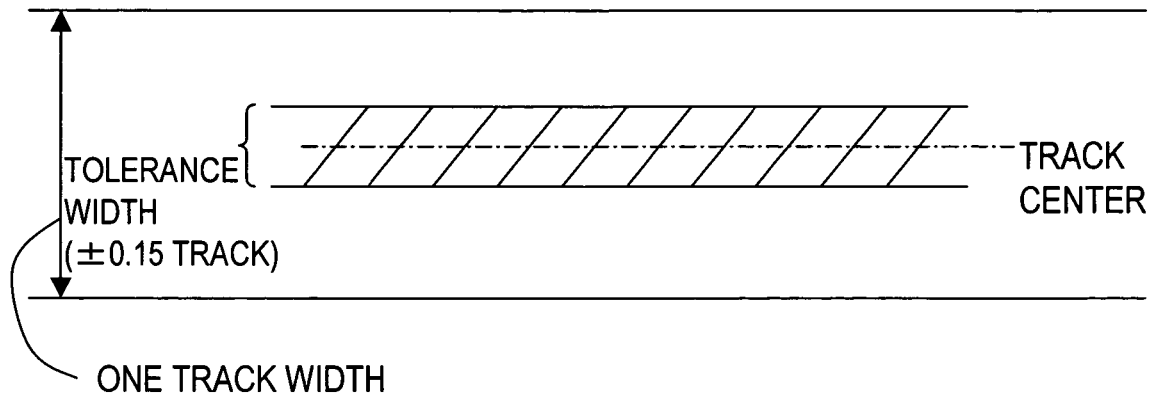
FIG. 18 is a diagram depicting the positioning accuracy for computing the slice value.
FIG. 19 shows the slice values using the positioning accuracy in FIG. 18.

FIG. 10 is a flow chart depicting the measurement processing of settling judgment conditions of the present invention, FIG. 11 is a block diagram depicting the measurement processing in FIG. 10, FIG. 12 is a diagram depicting the measurement processing in FIG. 10 and FIG. 11, FIG. 13 is a table showing the measurement processing result in FIG. 10 to FIG. 12, FIG. 14 to FIG. 17 are characteristic diagrams of the frequency vs. maximum value in each sample count in the measurement in FIG. 10, FIG. 18 is a diagram depicting the tolerance for deciding the settling judgment conditions, and FIG. 19 is a table showing the settling judgment conditions which are set according to the tolerance in FIG. 18.

First an overview of the measurement processing will be described with reference to FIG. 11 and FIG. 12. In the measurement processing, when an object is positioned, the object (head in the case of FIG. 1) draws a locus which vibrates with respect to the target position and converges to the target position, so the sine wave is regarded as the position error. Then the phase of this sine wave is changed, and it is determined what times the value of the settling judgment formula is maximum amplitude the sample after the settling judgment is completed or among the sample, and the maximum value of the magnification is determined. Since the frequency of the positional error changes depending on the seek distance and other factors, the maximum value is determined using various frequencies.

This measurement processing will be described concretely. As FIG. 11 shows, frequency F and phase Phase are instructed to the sine wave generation block 30, and the sine wave generation block 30 generates a sine wave Y having the specified frequency F and phase Phase. This sine wave Y is input to the judgment formula block 32 for computing a judgment value by a judgment formula at a predetermined sample period. For example, the judgment formula is Y[n] which is the value at each sample itself, or (2·Y[n]−Y[n−1]) which uses Y[n] which is a value of the current sample and Y[n−1] which is a value of the previous sample.

The value of the judgment value is sequentially delayed by the delay blocks 34-1 to 34-m, and the input and output of the delay blocks 34-1 to 34-m are input to the maximum value judgment block 36, and the maximum value judgment block 36 outputs the maximum value thereof Max1. In the case of FIG. 12, one sample of a sample point block is created after 5 samples of the judgment block. In the case of 5 samples, 4 delay blocks 34-1 to 34-m are provided, and 5 samples of judgment value Y[n−4] to Y[n] are input to the maximum value judgment block 36, and the maximum value Max1 thereof is output by the maximum value judgment block 36.

The sine wave Y of the sine wave generation block 30, on the other hand, is input to the analog waveform maximum value acquisition block 40. The analog waveform maximum value acquisition block 40 acquires the maximum value Max2 of the sine wave Y during the sample point block in FIG. 12.

The maximum value Max1, which is determined one sample before the maximum value Max2, is delayed by the delay block 38, and is input to the division block 42. The division block 42 determines the ratio Rate of the absolute value of the maximum value Max1 and the absolute value of the maximum value Max2 (=Max2/Max1).

As FIG. 12 shows, sine waves F1 (P1) to F1 (Pn) of each phase P1 to Pn are generated for one frequency F1, the ratio Rate at each frequency F1 is computed, and the maximum value acquisition block 44 acquires the maximum value Rate Max of the ratio Rate of each phase.

In other words, it is measured how much the maximum value of the judgment result of judging the position error by the judgment formula in the predetermined judgment block (5 samples in FIG. 12) appears in the position error (amplitude value) in the subsequent sample point block. The maximum value Rate (Max) of the ratio at this frequency is measured while changing the frequency of the sine wave (that is positional error), as shown in FIG. 12. For example, frequency is changed, as Fn in FIG. 12 shows, and the maximum value Rate (Max) of the ratio at the above mentioned specified frequency is measured.

The maximum amplitude ratio of each frequency acquired like this is stored in the table, as shown in FIG. 13. In other words, a table storing maximum ratio Rate (Max) at each frequency F (=f1, f2, - - - , fn) is acquired.

This measurement is implemented by executing a program, which will be described according to the flow in FIG. 10.

(S10) The setting frequency F is initialized to dF.

(S12) The setting phase Phase is initialized to "0", and the maximum ratio Rate (Max) is initialized to "0".

(S14) Sine wave Y=sin(2πF+Phase) is generated.

(S16) The generated sine wave Y is computed for the sample count in the judgment block (5 samples in FIG. 12) by the above mentioned judgment formula, and the maximum value Max1 thereof is determined.

(S18) The maximum value Max2 in the sample point block (FIG. 12) up to the next sample point is determined from the judgment block of the generated sine wave Y.

(S20) The ratio Rate (Phase) of the maximum values Max2 and Max1 at the phase Phase is computed by Rate (Phase)=abs (Max2/Max1).

(S22) It is judged whether the computed ratio Rate (Phase) is greater than the maximum ratio RateMax (F) thus far at the frequency. If Rate (Phase) is greater than the maximum ratio RateMax (F), the maximum ratio RateMax (F) is updated to the computed Rate (Phase).

(S24) Then, to change the phase, the setting phase is updated to (Phase+dphase).

(S26) It is judged whether the updated setting phase Phase is 2π or more. If the setting phase Phase is not 2π or more, processing returns to step S14.

(S28) If the updated setting phase Phase is 2π or more, the computation of the maximum ratio of the setting frequency F completes. Therefore the setting frequency F is updated to (F+dF) in order to move to the processing of the next frequency. And it is judged whether the updated setting frequency F is Fs (sampling frequency)/2 or more. If the updated setting frequency F is Fs (sampling frequency)/2 or more, it means that the setting frequency F has reached the Nyquist frequency, and control is impossible, so processing ends. If the updated setting frequency F is not Fs (sampling frequency)/2 or more, processing returns to step S12, and the maximum ratio is computed for the next frequency.

This computed result is stored in the table, as shown in FIG. 13. From the maximum amplitude ratio at each frequency with the judgment sample count in a judgment formula, the slice of the judgment formula is determined.

Figure 14:
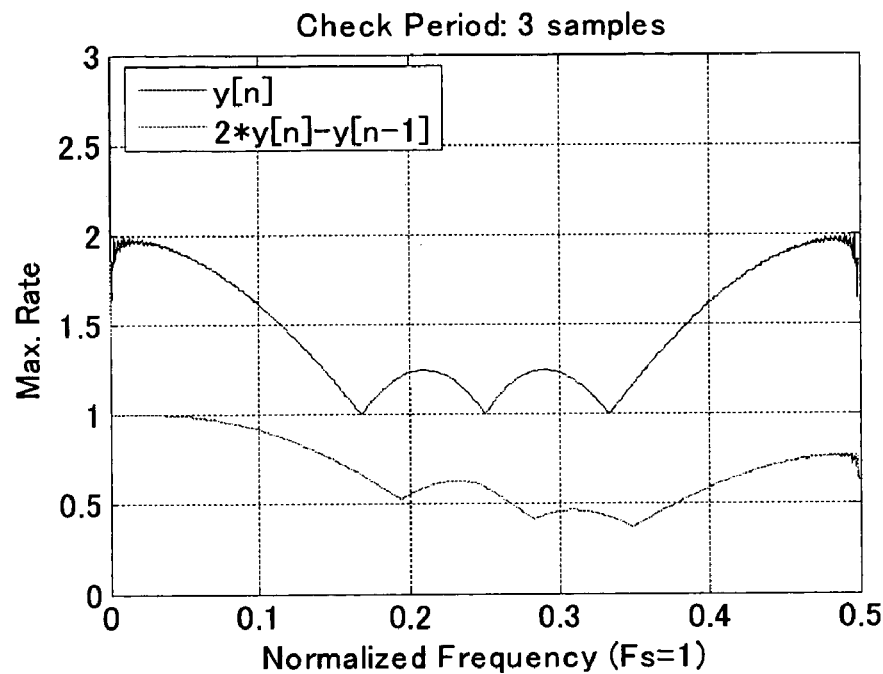
FIG. 14 is a relational diagram in the three sample judgment period acquired by the maximum value ratio computing for each frequency in FIG. 10.
Figure 15:
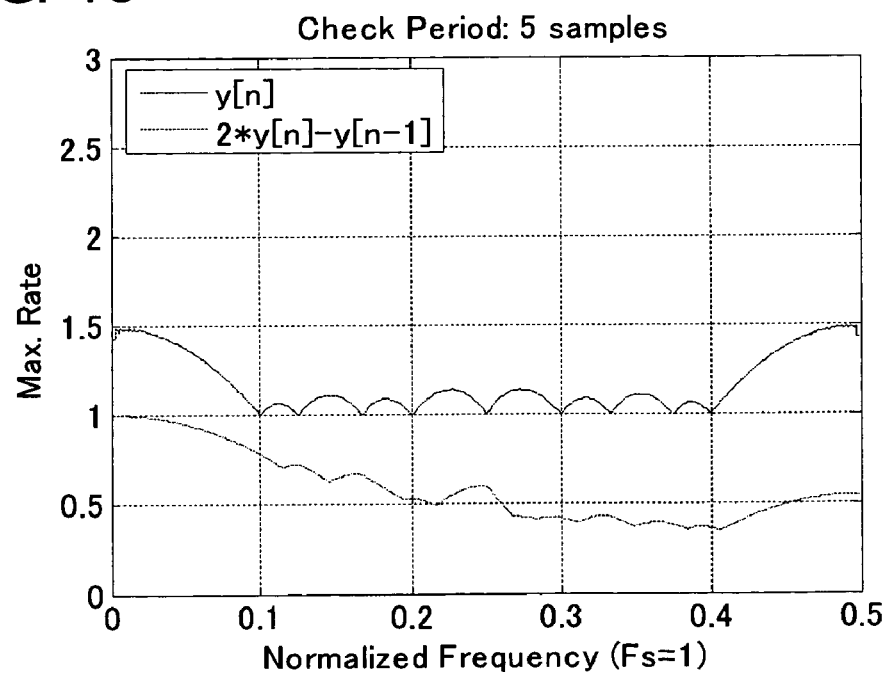
FIG. 15 is a relational diagram in the five sample judgment period acquired by the maximum value ratio computing for each frequency in FIG. 10.

FIG. 14 is a relational diagram of the frequency vs. maximum amplitude ratio MaxRate when the judgment sample count is "3". FIG. 15 is a relational diagram of the frequency vs. maximum amplitude ratio MaxRate when the judgment sample count is "5". Here the relationships when the judgment formula is y[n] and (2*y[n]−y[n−1]) are shown. Also in FIG. 14 and FIG. 15, the frequency in the abscissa is a normalized frequency with the sampling frequency Fs as "1", when only sample points are used.

This relational diagram shows that the maximum amplitude ratio changes at each frequency when a certain judgment formula is used, and that the maximum amplitude ratio differs if a different judgment formula is used.

FIG. 16 is a relational diagram of the frequency vs. maximum amplitude ratio MaxRate when the judgment sample count is "3", and the difference from FIG. 14 is that the maximum value in the sample section (see FIG. 12) is used in FIG. 16 while only values at the sample points are used in FIG. 14. FIG. 17 is a relational diagram of the frequency vs. maximum amplitude ratio MaxRate when the judgment sample count is "5", using the maximum value in the sample section is used.

As FIG. 16 and FIG. 17 show, in the case when the judgment formula is y[n], if the judgment sample count is 3 samples, the maximum of the maximum amplitude ratio is "2" except the area near the Nyquist frequency, and if the judgment sample count is 5 samples, the maximum of the maximum amplitude ratio is "1.5".

This means that the judgment value of a certain judgment formula shifts two times or 1.5 times at the maximum. Therefore if a tolerance of a settling range is "1", then two times or 1.5 times of slice at the maximum must be provided. As a consequence, an optimum slice value is acquired by dividing the tolerance by this maximum amplification ratio.

In the same way, in the case when the judgment formula is (2*y[n]−y[n−1]), if the judgment sample count is 3 samples, the maximum of the maximum amplitude ratio is "1" except the area near the Nyquist frequency, and if the judgment sample count is 5 samples, the maximum of the maximum amplitude ratio is "1".

This will be described with reference to FIG. 18 and FIG. 19. As FIG. 18 shows, in the case of a magnetic disk, for example, if a tolerance (positioning accuracy) ±0.15 of one track width from the track center is provided, the judgment slice value when the judgment formula is y[n] is 0.15/2=0.075 (track) if the judgment sample count is 3 samples, and is 0.15/1.5=0.10 (track) if the judgment sample count is 5 samples, as shown in the table in FIG. 19.

In the same way, when the judgment formula is (2*y[n]−y[]n−1]), the judgment slice value is 0.15/1.0=0.15 (track) if the judgment sample count is 3 samples, and is 0.15/1.0=0.15 (track) if the judgment sample count is 5 samples.

The sample count and slice value (absolute value) computed like this are set in the settling judgment block 24 in FIG. 4 and FIG. 6 to FIG. 9 according to the above mentioned judgment formula. For example, if y[n] is used for the judgment formula A in the settling judgment block 24, 0.15/2=0.075 (track) is set for the slice value A in the settling judgment block 54-1 of which judgment sample count is 3 samples, and 0.15/1.5=0.10 (track) is set for the slice value B for the settling judgment block 54-2 of which judgment sample count is 5 samples.

In the same way, if (2*y[n]−y[n−1]) is used for the judgment formula of the settling judgment block in FIG. 8, 0.15/1.0=0.15 (track) is set for the slice value of the settling block 54-3 of which judgment sample is 2 samples.

In this way, the sine wave is provided as a position error, the maximum value of the position error between the next sample and a specified sample is determined, and the ratio of the maximum value of the position error between these samples and the maximum value of the settling judgment formula during the judgment period is determined. While changing the phase of the sine wave, the maximum value of this ratio is determined for each frequency. And from the maximum value of the maximum values of the ratio at each frequency, the slice value of the specified sample count is determined using the tolerance, and is set in the settling judgment block 24.

Therefore an optimum sample count and slice value according to the settling judgment formula can be set, and accurate settling judgment can be performed at high-speed, regardless the vibration frequency applied to the target position.

(Another Positioning Device)

Figure 20:
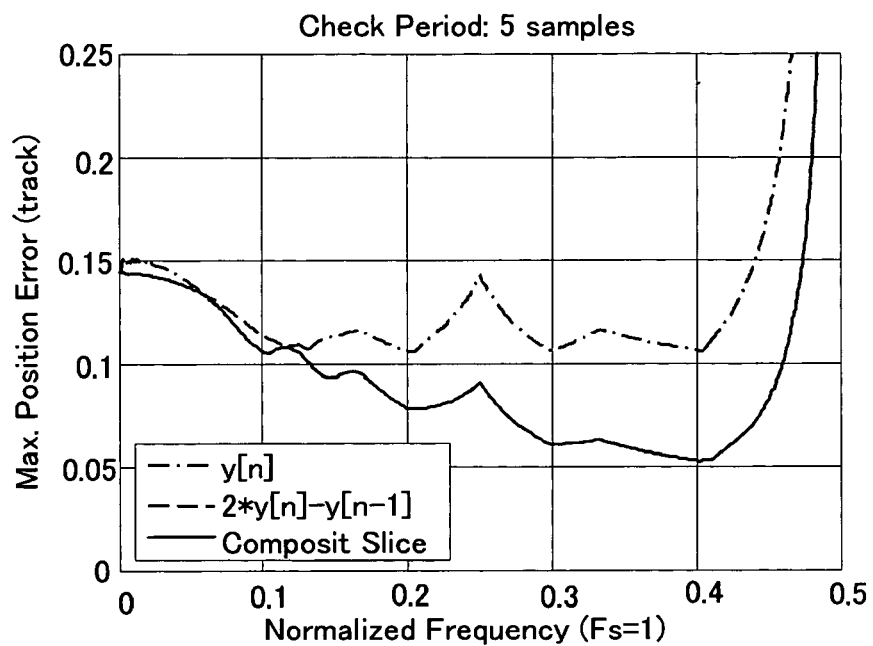
FIG. 20 is a diagram depicting another settling judgment mechanism according to the present invention.
Figure 21:
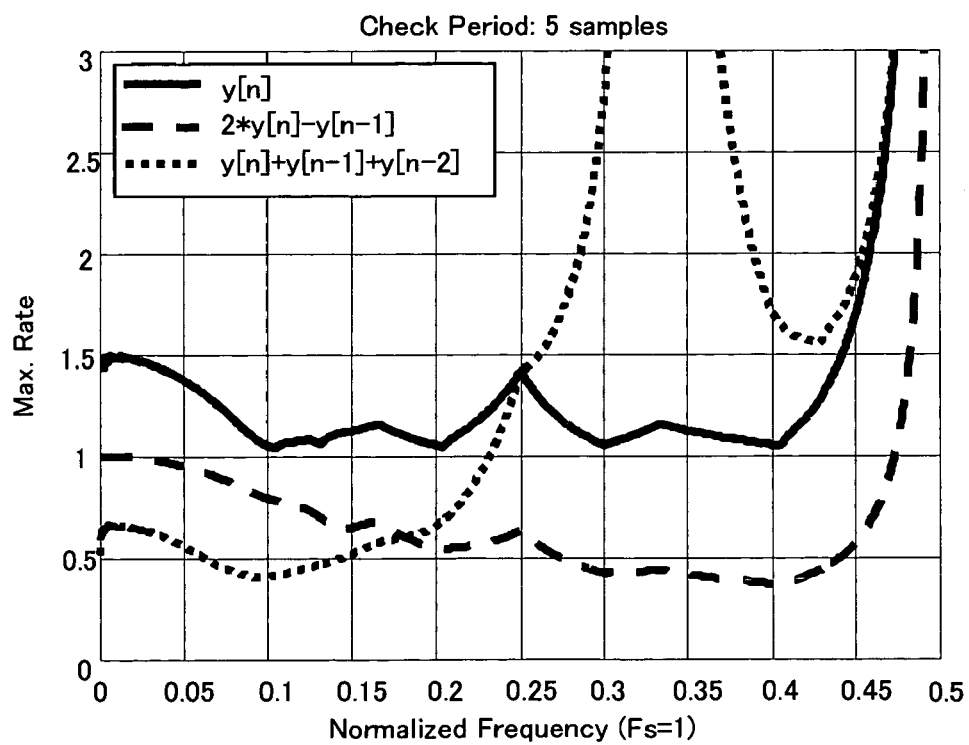
FIG. 21 is a frequency characteristic diagram depicting the case when the judgment sample count of another settling judgment formula is 5 according to the present invention.
Figure 22:
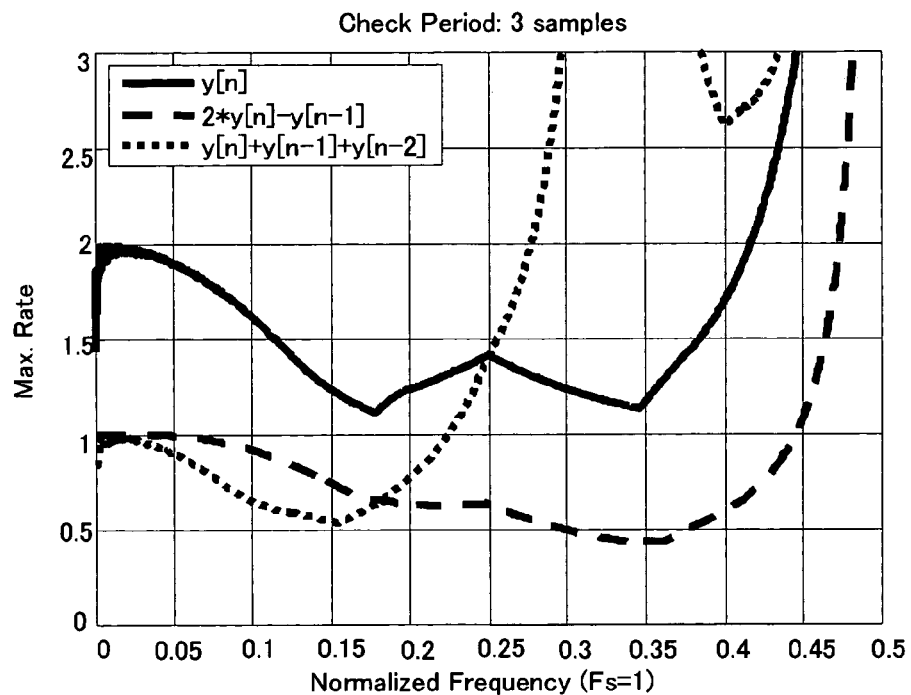
FIG. 22 is a frequency characteristic diagram depicting the case when the judgment sample count of another settling judgment formula is 3 according to the present invention.
Figure 23:
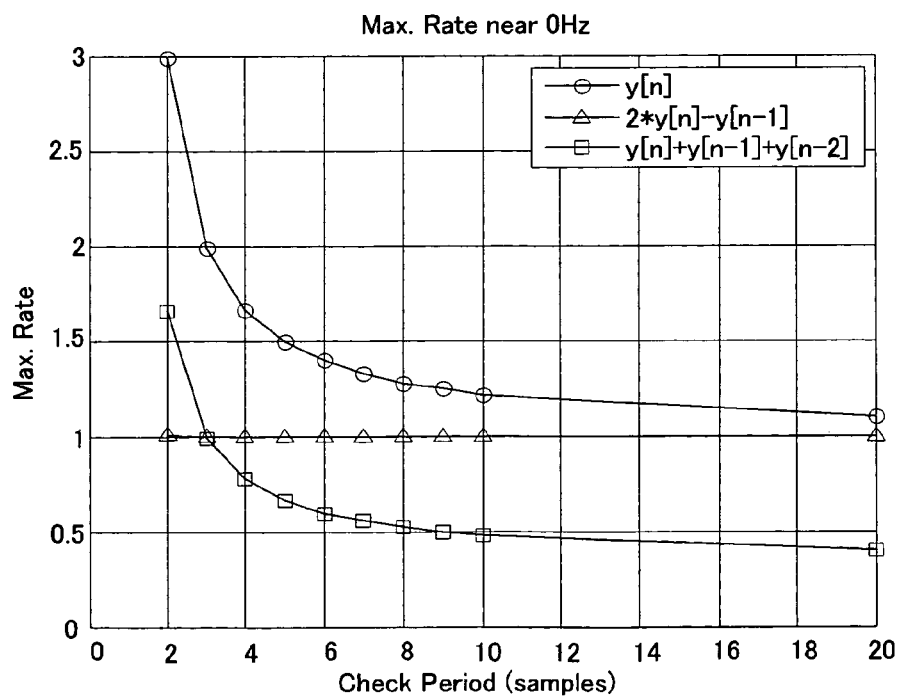
FIG. 23 is a relational diagram of the sample count vs. maximum amplitude ratio of another settling judgment formula according to the present invention.

FIG. 20 is a diagram depicting another settling judgment device condition of the present invention, FIG. 21 is a relational diagram of frequency vs. maximum value ratio with 5 samples, FIG. 22 is a relational diagram of frequency vs. maximum value ratio with 3 samples, and FIG. 23 is a relational diagram of judgment sample value and maximum value ratio.

FIG. 20 shows the maximum position error when y[n] and (2*y[n]−y[n−1]) are composed in the characteristic diagram with 5 samples in FIG. 17. The settling judgment capability in FIG. 8 is determined by this composite position error.

As FIG. 16, FIG. 17 and FIG. 20 show, in the composite characteristics of y[n] and (2*y[n]−y[n−1]), the amplitude of the position error is high at the low frequency area (e.g. normalized frequencies "0" to "0.1" in FIG. 20.

As a method to improve this, a method for using the sum of the position errors of the previous three samples is shown in FIG. 21 and FIG. 22. In other words, (y[n]+y[n−1]+y[n−2]) is used for the judgment formula. FIG. 21 and FIG. 22 show the result when the maximum value ratio with respect to frequency is computed as mentioned above, using this judgment formula.

FIG. 21 is a relational diagram of frequency vs. maximum amplification ratio MaxRate when the judgment sample count is "5", and the maximum value in the sample section (see FIG. 12) is used, just like FIG. 16. In the same way, FIG. 22 is a relational diagram of frequency vs. maximum amplification ratio MaxRate when the judgment sample count is "3", using the maximum value in the sample section.

The characteristics indicated by the dotted line in FIG. 21 and FIG. 22 are the characteristics of frequency vs. maximum value ratio when the judgment formula (y[n]+y[n−1]+y[n−2]) is used. In other words, the maximum value ratio is low at the low frequency area. By using this, the amplitude at the low frequency area can be decreased.

As FIG. 21 and FIG. 22 show, when (y[n]+y[n−1]+y[n−2]) is used for the judgment formula, the maximum value of the maximum amplification ratio is "0.6" in the low frequency area (e.g. normalized frequencies "0" to "0.15" in FIG. 21) if the judgment sample count is 5 samples, and the maximum value of the maximum amplification ratio is "0.7" in the low frequency area (e.g. normalized frequency "0.07" to "0.15" in FIG. 22) if the judgment sample count is 3 samples.

If the above mentioned tolerance (positioning accuracy) with a ±0.15 of one track width, shown in FIG. 18, is provided, the judgment slice value is 0.15/0.6=0.25 (track) in the case of 5 sample count, and is 0.15/0.7=0.214 (track) in the case of 3 sample count.

FIG. 23 shows the relationships of the check sample count and the maximum amplification ratio of the above mentioned three judgment formulas. As FIG. 23 shows, the maximum amplification ratio is a different value depending on the check sample count according to the settling judgment formula.

Therefore as described in FIG. 7 to FIG. 9, the slice value is set low if the count value is small, and the slice value is set high if the count value is large.

And as FIG. 9 shows, the settling judgment mechanism using the three settling judgment formulas is constructed, then settling can be judged at high-speed, even in the low frequency area.

Figures 24, 25:
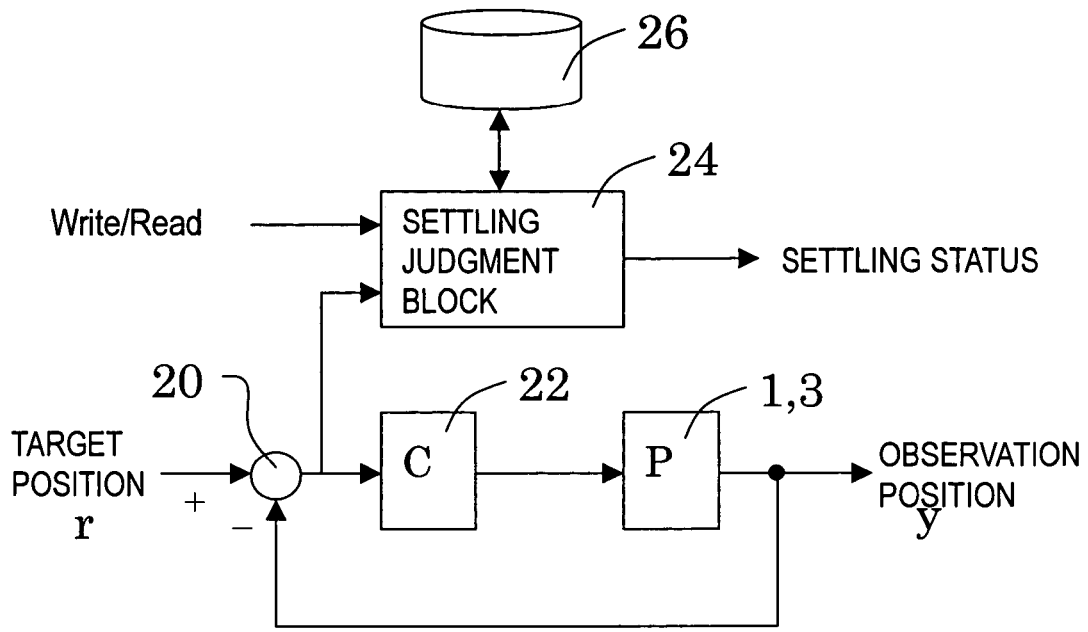
FIG. 24 is a block diagram depicting another embodiment of the positioning control device according to the present invention.
FIG. 25 shows the slice value table in FIG. 24.

FIG. 24 is a block diagram depicting the computation of the servo control system executed by the MCU 14 of the second embodiment of the present invention. FIG. 25 shows a explanation diagram of a table 26. In this example, the setting of settling judgment conditions, when the tolerance is changed, depends on read or write of the disk. In other words, this is an example when tolerance is wider in read than write, since an accurate write position is required for writing.

As FIG. 24 shows, the servo control system computes the position error 'e' between the target position 'r' and the current position 'y' using the computing block 20, computes the control amount Un using the control block (Cn) 21, and drives the VCMs 1 and 3, which are the plant 22. For the position of the plant, the servo signal from the magnetic head 3 is demodulated to compute the current position y, which is fed back to the computing block 20.

The settling judgment block 24 judges settling using the position error 'e' by the settling judgment formula and the settling judgment conditions (slice value and sample count). For the settling judgment formula, the position error e (=Y[n]) itself is used, or (2·Y[n]−Y[n−1]) is used. The table 26 stores the slice values according to write/read, and sets them in the settling judgment block 24.

As FIG. 25 shows, in the case when the tolerance of write is "±0.15" and the tolerance of read is "±0.30", and the judgment formula is y[n], the judgment slice value for write is 0.15/2=0.075 (track) and the judgment slice value for read is 0.150 if the judgment sample is 3 samples, according to FIG. 16 and FIG. 17. And in the same way, the judgment slice value for write is 0.15/1.5=0.10 (track) and the judgment slice value for read is 0.20 if the judgment sample count is 5 samples.

In the case when the judgment formula is (2*y[n]−y[n−1]), the judgment slice value for write is 0.15/1.0=0.15 (track) and the judgment slice value for read is 0.30 if the judgment sample count is 3 samples. In the same way, the judgment slice value for write is 0.15/1.0=0.15 (track) and the judgment slice value for read is 0.30 if the judgment sample count is 5 samples.

In this way, an optimum slice value and sample count can be set for each read and write, and accurate settling judgment at high-speed becomes possible for both read and write regardless the vibration frequency applied to the target position. In this case as well, as shown in FIG. 7 or FIG. 8, further accurate settling judgment at high-speed becomes possible by using a plurality of settling judgment blocks having a different judgment sample count and judgment slice value.

OTHER EMBODIMENTS

In the above embodiments, the positioning control device was described using an example of the head positioning device of a magnetic disk device, but the present invention can also be applied to other disk devices, such as an optical disk device, and can also be applied to a positioning control device for an object other than a disk device. Different values may be used for the tolerance (positioning accuracy), and different values may also be used for the sample count.

The present invention was described above using embodiments, but the present invention can be modified in various ways within the scope of the essential character thereof, and these shall not be excluded from the scope of the present invention.

A plurality of judgment slice values and continuous sample counts for settling judgment are set, and the judgment value of settling is judged using a different judgment slice value and continuous sample count, so settling can be accurately judged at high-speed according to the settling judgment formula, and both improvement of positioning accuracy and high-speed judgment can be implemented.

What is claimed is:

1. A settling judgment method of judging settling to a target position in a positioning control device which controls a position of an object according to a position error between the target position and a current position, comprising:
   a step of computing a judgment value of the position error for each sample by a predetermined judgment formula;
   a first step of, by using a first judgment sample count and a first judgment slice value, judging whether a sample of which judgment value is less than the first judgment slice value continues for the first judgment sample count;
   a second step of, by using a second judgment sample count which is different from the first judgment sample count and a second judgment slice value which is different from the first judgment slice value, judging whether a sample of which judgment value is less than the second judgment slice value continues for the second judgment sample count; and
   a step of outputting OR of the judgment results of the first judgment step and the second judgment step as the settling judgment result.

2. The settling judgment method in a positioning control device according to claim 1, wherein the first step further comprises a step of using the first sample count which is relatively small and the first slice value which is relatively small,
   and the second step further comprises a step of using the second sample count which is relatively large and the second slice value which is relatively large.

3. The settling judgment method in a positioning control device according to claim 1, further comprising:
   a step of computing a judgment value of the position error for each sample using another predetermined judgment formula;
   a third step of, by using a third judgment sample count and a third judgment slice value, judging whether a sample of which judgment value is less than the third slice value continues for the third judgment sample count; and
   a step of outputting an AND result of the OR result and the judgment result of the third step as the settling judgment result.

4. The settling judgment method in a positioning control device according to claim 3, wherein the third step further comprises:
   a fourth step of judging whether a sample of which judgment value is less than the fourth slice value continues for the fourth judgment sample count;
   a fifth step of, by using a fifth judgment sample count which is different from the fourth judgment sample count and a fifth judgment slice value which is different from the fourth judgment slice value, judging whether a sample of which judgment value is less than the fifth slice value continues for the fifth judgment sample count; and
   a step of outputting OR of the judgment results of the fourth judgment step and the fifth judgment step as the above mentioned judgment result.

5. The settling judgment method in a positioning control device according to claim 1, wherein the first step and the second step further comprises a step of using a slice value and a judgment sample count which are set such that a maximum value of a ratio of the maximum amplitude value, determined for each frequency of periodic disturbance from the maximum amplitude value of the judgment value when periodic disturbance is applied, is confined within a predetermined positioning accuracy.

6. The settling judgment method in a positioning control device according to claim 5, wherein the first step and the second step further comprise a step of using a slice value and a judgment sample count which are set such that a maximum value of a ratio of the maximum amplitude value, determined for each frequency of periodic disturbance from the maximum amplitude value of the judgment value when a sine wave is applied as the periodic disturbance, is confined within a predetermined positioning accuracy.

7. The settling judgment method in a positioning control device according to claim 1, wherein the output step further comprises a step of outputting a judgment result on whether the position of a head is settled in a target position of a disk.

8. A positioning control device, comprising:
a positioning control block which controls a position of an object according to a position error between a target position and a current position; and
a settling judgment block which computes a judgment value of the position error for each sample by a predetermined judgment formula, by using a first judgment sample count and a first judgment slice value, judges whether a sample of which judgment value is less than the first slice value continues for the first judgment sample count, by using a second judgment sample count which is different from the first judgment sample count and a second judgment slice value which is different from the first judgment slice value, judges whether a sample of which judgment value is less than the second slice value continues for the second judgment sample count, and outputs OR of both the judgment results as the settling judgment result.

9. The positioning control device according to claim 8, wherein the settling judgment block judges using the first sample count which is relatively small and the first slice value which is relatively small, and judges using the second sample count which is relatively large and the second slice value which is relatively large.

10. The positioning control device according to claim 8, wherein the settling judgment block computes a judgment value of the position error for each sample using another judgment formula, by using the third judgment sample count and the third judgment slice value, judges whether a sample of which judgment value is less than the third slice value continues for the third judgment sample count, and outputting an AND result of the OR and the third judgment result as the settling judgment result.

11. The positioning control device according to claim 10, wherein the settling judgment block judges whether a sample of which judgment value is less than the fourth slice value continues for the fourth judgment sample count, by using the fifth judgment sample count which is different from the fourth judgment sample count and the fifth judgment slice value which is different from the fourth judgment slice value, judges whether a sample count of which judgment value is less than the fifth slice value continues for the fifth judgment sample count, and outputs OR of both judgment results as the third judgment result.

12. The positioning control device according to claim 8, wherein the settling judgment block uses a slice value and a judgment sample count which are set such that a maximum value of a ratio of the maximum amplitude value, determined for each frequency of the periodic disturbance from the maximum amplitude value of the judgment value when periodic disturbance is applied, is confined within a predetermined positioning accuracy.

13. The positioning control device according to claim 8, wherein the positioning control block positions a head as the object to a target position of a disk.

14. The positioning control device according to claim 13, wherein the settling judgment block judges whether the head is settled within the positioning accuracy range of the target position.

15. The positioning control device according to claim 8, wherein the settling judgment block judges that the judgment value is less than a write slice value which is set such that a maximum value of a ratio of the maximum amplitude value determined for each frequency of periodic disturbance from the maximum amplitude value of the judgment value when the periodic disturbance is applied, is confined within a predetermined write positioning accuracy of the head, or less than a read slice value which is set such that the above maximum value is confined within a predetermined read positioning accuracy of the head.

16. The positioning control device according to claim 15, wherein the settling judgment block selects the write slice value or read slice value depending on whether operation is the read operation or write operation of the disk by the head.

17. The positioning control device according to claim 13, wherein the settling judgment block judges whether the head is settled at the target position during seek control of the head.

18. The positioning control device according to claim 13, wherein the settling judgment block judges whether the head is following up to the target position.

* * * * *

UNITED STATES PATENT AND TRADEMARK OFFICE
CERTIFICATE OF CORRECTION

PATENT NO.         : 7,460,330 B2
APPLICATION NO. : 11/598998
DATED              : December 2, 2008
INVENTOR(S)        : Takaishi It is certified that error appears in the above-identified patent and that said Letters Patent is hereby corrected as shown below:

Col. 15, line 42, delete "OR and" and insert --OR result and--.

Signed and Sealed this

Twenty-fourth Day of February, 2009

JOHN DOLL
*Acting Director of the United States Patent and Trademark Office*